(12) United States Patent
Charlton et al.

(10) Patent No.: US 11,354,898 B2
(45) Date of Patent: Jun. 7, 2022

(54) DYNAMIC CONTEXTUAL MEDIA FILTER

(71) Applicant: Snap Inc., Santa Monica, CA (US)

(72) Inventors: Ebony James Charlton, Los Angeles, CA (US); Celia Nicole Mourkogiannis, Los Angeles, CA (US); Travis Chen, Los Angeles, CA (US); Kevin Dechau Tang, Los Angeles, CA (US); Kaveh Anvaripour, Santa Monica, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/237,932

(22) Filed: Apr. 22, 2021

(65) Prior Publication Data
US 2021/0240990 A1  Aug. 5, 2021

Related U.S. Application Data

(63) Continuation of application No. 16/852,045, filed on Apr. 17, 2020, now Pat. No. 11,017,234, which is a continuation of application No. 16/232,787, filed on Dec. 26, 2018, now Pat. No. 10,699,123.

(51) Int. Cl.
| | |
|---|---|
| *G06T 7/70* | (2017.01) |
| *G06F 16/538* | (2019.01) |
| *G06F 16/51* | (2019.01) |
| *G06T 11/60* | (2006.01) |
| *G06F 3/0482* | (2013.01) |
| *G06V 20/20* | (2022.01) |

(52) U.S. Cl.
CPC .............. *G06V 20/20* (2022.01); *G06F 16/51* (2019.01); *G06F 16/538* (2019.01); *G06T 7/70* (2017.01); *G06T 11/60* (2013.01); *G06F 3/0482* (2013.01)

(58) Field of Classification Search
CPC ....... G06V 20/20; G06F 16/51; G06F 16/538; G06F 3/0482; G06T 7/70; G06T 11/60; H04N 21/4725
See application file for complete search history.

(56) References Cited

U.S. PATENT DOCUMENTS 10,699,123 B1    6/2020  Charlton et al.
11,017,234 B2*   5/2021  Charlton ................. G06F 16/51
(Continued)

FOREIGN PATENT DOCUMENTS

CN       113228693       8/2021
WO    WO-2020139948 A1   7/2020

OTHER PUBLICATIONS

"U.S. Appl. No. 16/232,787, Examiner Interview Summary dated Nov. 19, 2019", 4 pgs.

(Continued)

*Primary Examiner* — Jeffery A Brier
(74) *Attorney, Agent, or Firm* — Schwegman Lundberg & Woessner, P.A.

(57) ABSTRACT

A contextual filter system configured to perform operations that include, capturing an image frame at a client device, wherein the image frame includes a depiction of an object, identifying an object category of the object based on the depiction of the object within the image frame, accessing media content associated with the object category within a media repository, generating a presentation of the media content, and causing display of the presentation of the media content within the image frame at the client device.

20 Claims, 9 Drawing Sheets

(56) References Cited

U.S. PATENT DOCUMENTS

| | | | |
|---|---|---|---|
| 2013/0163960 | A1 | 6/2013 | Abecassis |
| 2013/0251337 | A1 | 9/2013 | Abecassis |
| 2013/0262588 | A1 | 10/2013 | Barak et al. |
| 2013/0342573 | A1 | 12/2013 | Leazenby et al. |
| 2015/0208131 | A1 | 7/2015 | Chatter et al. |
| 2017/0060580 | A1 | 3/2017 | Brandt |
| 2017/0115853 | A1 | 4/2017 | Allekotte et al. |
| 2017/0132821 | A1 | 5/2017 | Valliani et al. |
| 2017/0192401 | A1 | 7/2017 | Wexler et al. |
| 2017/0371900 | A1 | 12/2017 | Golbandi et al. |
| 2018/0096529 | A1 | 4/2018 | Menard et al. |
| 2018/0253900 | A1 | 9/2018 | Finding et al. |
| 2020/0210703 | A1 | 7/2020 | Charlton et al. |
| 2020/0242363 | A1 | 7/2020 | Charlton et al. |

OTHER PUBLICATIONS

"U.S. Appl. No. 16/232,787, Non Final Office Action dated Nov. 5, 2019", 14 pgs.

"U.S. Appl. No. 16/232,787, Notice of Allowance dated Feb. 26, 2020", 9 pgs.

"U.S. Appl. No. 16/232,787, Response filed Feb. 5, 2020 to Non Final Office Action dated Nov. 5, 2019", 12 pgs.

"U.S. Appl. No. 16/852,045, Corrected Notice of Allowability dated Feb. 10, 2021", 2 pgs.

"U.S. Appl. No. 16/852,045, Notice of Allowance dated Jan. 22, 2021", 12 pgs.

"International Application Serial No. PCT/US2019/068580, International Search Report dated Apr. 14, 2020", 4 pgs.

"International Application Serial No. PCT/US2019/068580, Written Opinion dated Apr. 14, 2020", 5 pgs.

"Samsung Galaxy S4 User Guide", Samsung Telecommunications America (STA), LLC, [Online] Retrieved form the Internet on Oct. 31, 2019: <URL: http://cache.vzw.com/muitimedia/mim/sam_galaxy_s4/samsung_galaxy_s_4_um.pdf,, (2013), 238 pgs.

"International Application Serial No. PCT/US2019/068580, International Preliminary Report on Patentability dated Jul. 8, 2021", 7 pgs.

* cited by examiner

400

```
┌─────────────────────────────────────────────────────────────┐
│  CAPTURING AN IMAGE FRAME AT A CLIENT DEVICE, THE IMAGE FRAME │
│         INCLUDING A DEPICTION OF AN OBJECT                   │
│                         402                                  │
└─────────────────────────────────────────────────────────────┘
                              ▼
┌─────────────────────────────────────────────────────────────┐
│  IDENTIFYING AN OBJECT CATEGORY OF THE OBJECT BASED ON THE   │
│      DEPICTION OF THE OBJECT WITHIN THE IMAGE FRAME          │
│                         404                                  │
└─────────────────────────────────────────────────────────────┘
                              ▼
┌─────────────────────────────────────────────────────────────┐
│ ACCESSING MEDIA CONTENT ASSOCIATED WITH THE OBJECT CATEGORY  │
│  WITHIN A MEDIA REPOSITORY, IN RESPONSE TO THE IDENTIFYING THE│
│                     OBJECT CATEGORY                          │
│                         406                                  │
└─────────────────────────────────────────────────────────────┘
                              ▼
┌─────────────────────────────────────────────────────────────┐
│         GENERATING A PRESENTATION OF THE MEDIA CONTENT       │
│                         408                                  │
└─────────────────────────────────────────────────────────────┘
                              ▼
┌─────────────────────────────────────────────────────────────┐
│  CAUSING DISPLAY OF THE PRESENTATION OF THE MEDIA CONTENT    │
│       WITHIN THE IMAGE FRAME AT THE CLIENT DEVICE            │
│                         410                                  │
└─────────────────────────────────────────────────────────────┘
```

```
┌─────────────────────────────────────────────────────────────┐
│ RETRIEIVING A MEDIA TEMPLATE THAT CORRESPONDS WITH THE OBJECT│
│  CATEGORY IN RESPONSE TO THE IDENTFYING THE OBJECT CATEGORY  │
│                             502                              │
└─────────────────────────────────────────────────────────────┘
                              │
                              ▼
┌─────────────────────────────────────────────────────────────┐
│     POPULATING THE MEDIA TEMPLATE WITH THE MEDIA CONTENT     │
│            ASSOCIATED WITH THE OBJECT CATEGORY               │
│                             504                              │
└─────────────────────────────────────────────────────────────┘
                              │
                              ▼
┌─────────────────────────────────────────────────────────────┐
│ CAUSING DISPLAY OF A PRESENTATION OF THE POPULATED TEMPLATE  │
│         WITHIN THE IMAGE FRAME AT THE CLIENT DEVICE          │
│                             506                              │
└─────────────────────────────────────────────────────────────┘
```

CAPTURING AN IMAGE FRAME AT A CLIENT DEVICE, THE IMAGE FRAME
INCLUDING A DEPICTION OF AN OBJECT
602

DETERMINING A CONTEXT OF THE CLIENT DEVICE IN RESPONSE TO THE
CAPTURING THE IMAGE FRAME
604

SELECTING THE MEDIA CONTENT BASED ON THE CONTEXT OF THE
CLIENT DEVICE AND THE OBJECT CATEGORY OF THE OBJECT DEPICTED
WITHIN THE IMAGE FRAME
606

*FIG. 6*

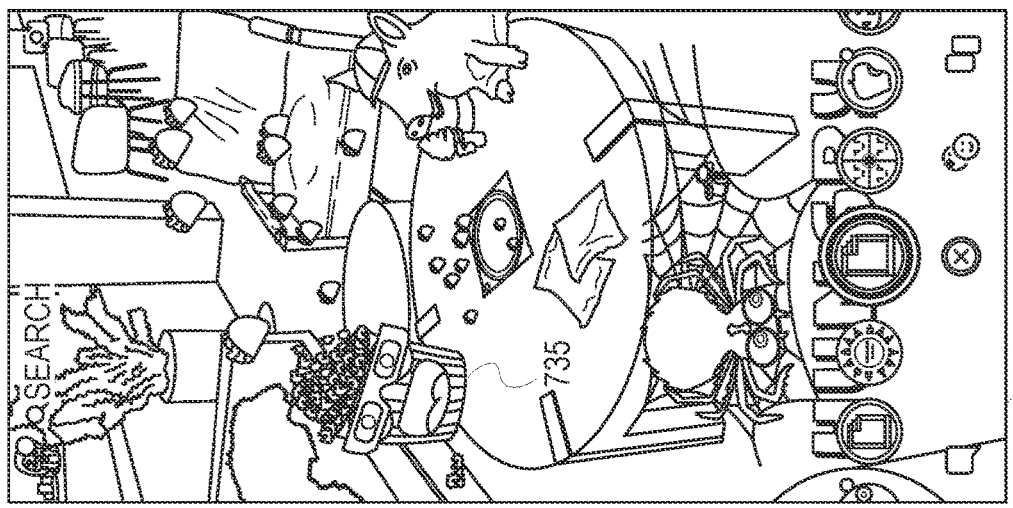
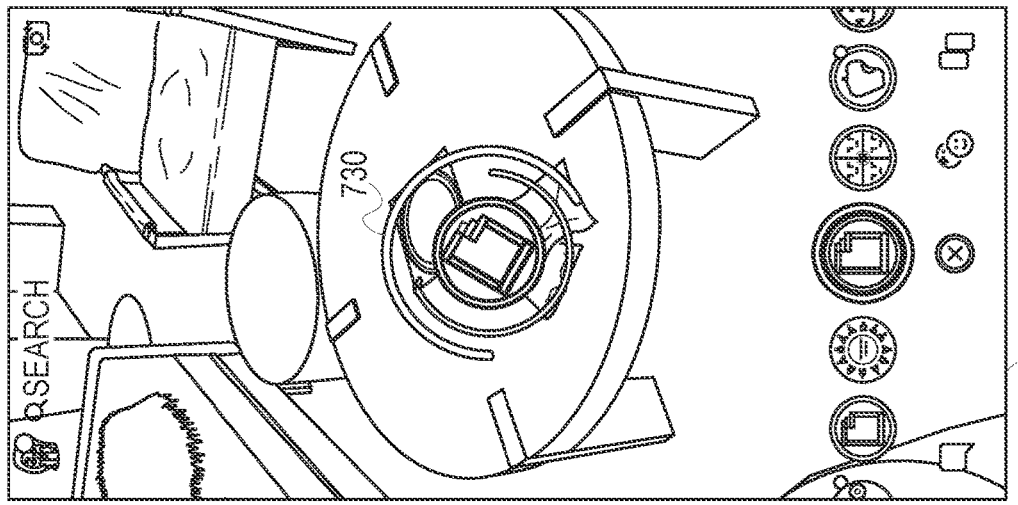
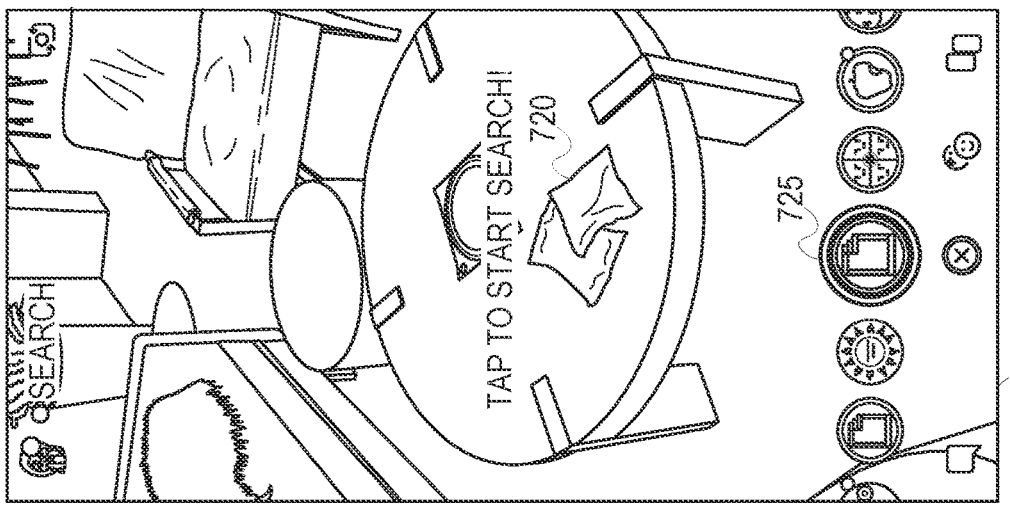
FIG. 7

DYNAMIC CONTEXTUAL MEDIA FILTER

CLAIM OF PRIORITY

This application is a continuation of U.S. patent application Ser. No. 16/852,045, filed on Apr. 17, 2020, which is a continuation of U.S. patent application Ser. No. 16/232,787, filed on Dec. 26, 2018, each of which are incorporated herein by reference in their entireties.

TECHNICAL FIELD

Embodiments of the present disclosure relate generally to mobile computing technology and, more particularly, but not by way of limitation, to systems for generating and displaying dynamic contextual media content at a client device.

BACKGROUND

Augmented reality (AR), is a live direct or indirect view of a physical, real-world environment whose elements are augmented by computer-generated sensory inputs.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart depicting a method of causing display of a contextual filter, according to certain example embodiments.

FIG. 5 is a flowchart depicting a method of causing display of a contextual filter, according to certain example embodiments.

FIG. 6 is a flowchart depicting a method of generating a contextual filter to be displayed at a client device, according to certain example embodiments.

FIG. 7 is an interface flow-diagram depicting interfaces presented by a contextual filter system, according to certain example embodiments.

DETAILED DESCRIPTION

Figure 1:
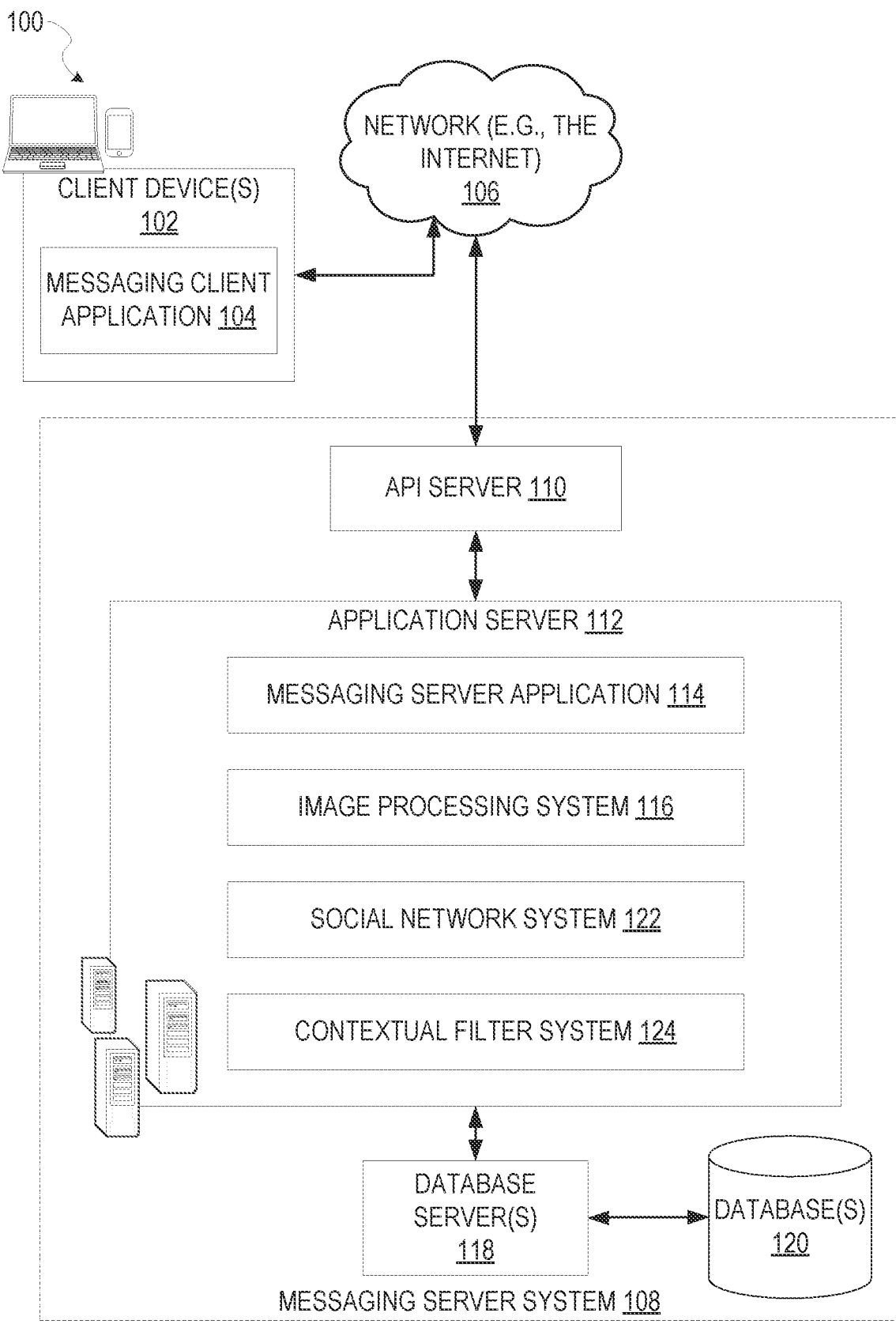
FIG. 1 is a block diagram showing an example messaging system for exchanging data (e.g., messages and associated content) over a network in accordance with some embodiments, wherein the messaging system includes a contextual filter system.

As discussed above, AR systems provide users within graphical user interfaces (GUI) to display a live direct or indirect view of a physical, real-world environment, wherein elements of the view are augmented by computer-generated sensory inputs. For example, an AR interface may present media content at positions within a display of a view of a real-world environment, such that the media content appears to interact with elements in the real-world environment.

Example embodiments described herein relate to a contextual filter system to generate and display contextual filters at a client device. According to certain embodiments, the contextual filter system is configured to perform operations that include, capturing an image frame at a client device, wherein the image frame includes a depiction of an object, identifying an object category of the object based on the depiction of the object within the image frame, accessing media content associated with the object category within a media repository, generating a presentation of the media content, and causing display of the presentation of the media content within the image frame at the client device.

The media content may include animated Graphics Interchange Format (GIF) images, of various shapes, sizes and themes. In some embodiments, the contextual filter system may be in communication with a media repository that comprises a sorted and labeled collection of the media content, wherein the media content within the collection of media content is labeled or tagged based on attributes of the media content. For example, the media content may be tagged with a label that identifies an object category of the media content, such as "food," or "basketball," such that a reference to the object category corresponds with a set of media content from among the collection of media content.

In some embodiments, responsive to receiving an input that selects a user option from among a set of user options, the contextual filter system captures an image from a client device, wherein the image frame comprises a depiction of one or more objects in a real-world environment, and identifies an object category of one or more of the object depicted within the image frame. For example, the contextual filter system may detect one or more Quick Response (QR) codes within the image frame, wherein the QR codes identify an object or object category associated with the object depicted within the image frame, or in further embodiments may also employ one or more image and text recognition techniques to identify the object depicted in the image frame. Based on the identification of the object or object category, the contextual filter system retrieves a set of labels or tags associated with the object or object category, and queries a media repository to identify media content based on the set of labels or tags. The identified media content from the content repository may therefore comprise a set of media content associated with the object or object category identified within the image frame.

In response to identifying the set of media content from the media repository, the contextual filter system generates and causes display of the set of media content at the client device. In some embodiments, to generate the presentation of the set of media content, the contextual filter system retrieves a media template that provides a presentation format and layout for the set of media content. For example, the media template may define positions to present the set of media content within the image frame at the client device. In some embodiments, the presentation of the set of media content within the image frame at the client device may be based on a position (or positions) of the objects identified within the image frame.

FIG. 1 is a block diagram showing an example messaging system 100 for exchanging data (e.g., messages and associated content) over a network. The messaging system 100 includes one or more client device 102 which host a number of applications including a messaging client application 104. Each messaging client application 104 is communicatively coupled to other instances of the messaging client application 104 and a messaging server system 108 via a network 106 (e.g., the Internet).

Accordingly, each messaging client application 104 is able to communicate and exchange data with another messaging client application 104 and with the messaging server system 108 via the network 106. The data exchanged between messaging client applications 104, and between a messaging client application 104 and the messaging server system 108, includes functions (e.g., commands to invoke functions) as well as payload data (e.g., text, audio, video or other multimedia data).

The messaging server system 108 provides server-side functionality via the network 106 to a particular messaging client application 104. While certain functions of the messaging system 100 are described herein as being performed by either a messaging client application 104 or by the messaging server system 108, it will be appreciated that the location of certain functionality either within the messaging client application 104 or the messaging server system 108 is a design choice. For example, it may be technically preferable to initially deploy certain technology and functionality within the messaging server system 108, but to later migrate this technology and functionality to the messaging client application 104 where a client device 102 has a sufficient processing capacity.

The messaging server system 108 supports various services and operations that are provided to the messaging client application 104. Such operations include transmitting data to, receiving data from, and processing data generated by the messaging client application 104. In some embodiments, this data includes, message content, client device information, geolocation information, media annotation and overlays, message content persistence conditions, social network information, and live event information, as examples. In other embodiments, other data is used. Data exchanges within the messaging system 100 are invoked and controlled through functions available via GUIs of the messaging client application 104.

Turning now specifically to the messaging server system 108, an Application Program Interface (API) server 110 is coupled to, and provides a programmatic interface to, an application server 112. The application server 112 is communicatively coupled to a database server 118, which facilitates access to a database 120 in which is stored data associated with messages processed by the application server 112.

Dealing specifically with the Application Program Interface (API) server 110, this server receives and transmits message data (e.g., commands and message payloads) between the client device 102 and the application server 112. Specifically, the Application Program Interface (API) server 110 provides a set of interfaces (e.g., routines and protocols) that can be called or queried by the messaging client application 104 in order to invoke functionality of the application server 112. The Application Program Interface (API) server 110 exposes various functions supported by the application server 112, including account registration, login functionality, the sending of messages, via the application server 112, from a particular messaging client application 104 to another messaging client application 104, the sending of media files (e.g., images or video) from a messaging client application 104 to the messaging server application 114, and for possible access by another messaging client application 104, the setting of a collection of media data (e.g., story), the retrieval of a list of friends of a user of a client device 102, the retrieval of such collections, the retrieval of messages and content, the adding and deletion of friends to a social graph, the location of friends within a social graph, opening and application event (e.g., relating to the messaging client application 104).

The application server 112 hosts a number of applications and subsystems, including a messaging server application 114, an image processing system 116, a social network system 122, and a contextual filter system 124. The contextual filter system 124 is configured to capture an image frame that includes a depiction of an object from a client device 102, identify one or more objects or object categories within the image frame based on the depiction of the object, select one or more labels or tags based on the object or object categories, retrieve a set of media content based on the labels or tags, and cause display of a presentation of the set of media content within the image frame at the client device, according to some example embodiments. Further details of the contextual filter system 124 can be found in FIG. 3 below.

The messaging server application 114 implements a number of message processing technologies and functions, particularly related to the aggregation and other processing of content (e.g., textual and multimedia content) included in messages received from multiple instances of the messaging client application 104. As will be described in further detail, the text and media content from multiple sources may be aggregated into collections of content (e.g., called stories or galleries). These collections are then made available, by the messaging server application 114, to the messaging client application 104. Other processor and memory intensive processing of data may also be performed server-side by the messaging server application 114, in view of the hardware requirements for such processing.

The application server 112 also includes an image processing system 116 that is dedicated to performing various image processing operations, typically with respect to images or video received within the payload of a message at the messaging server application 114.

The social network system 122 supports various social networking functions services, and makes these functions and services available to the messaging server application 114. To this end, the social network system 122 maintains and accesses an entity graph 304 within the database 120. Examples of functions and services supported by the social network system 122 include the identification of other users of the messaging system 100 with which a particular user has relationships or is "following," and also the identification of other entities and interests of a particular user.

The application server 112 is communicatively coupled to a database server 118, which facilitates access to a database 120 in which is stored data associated with messages processed by the messaging server application 114.

Figure 2:
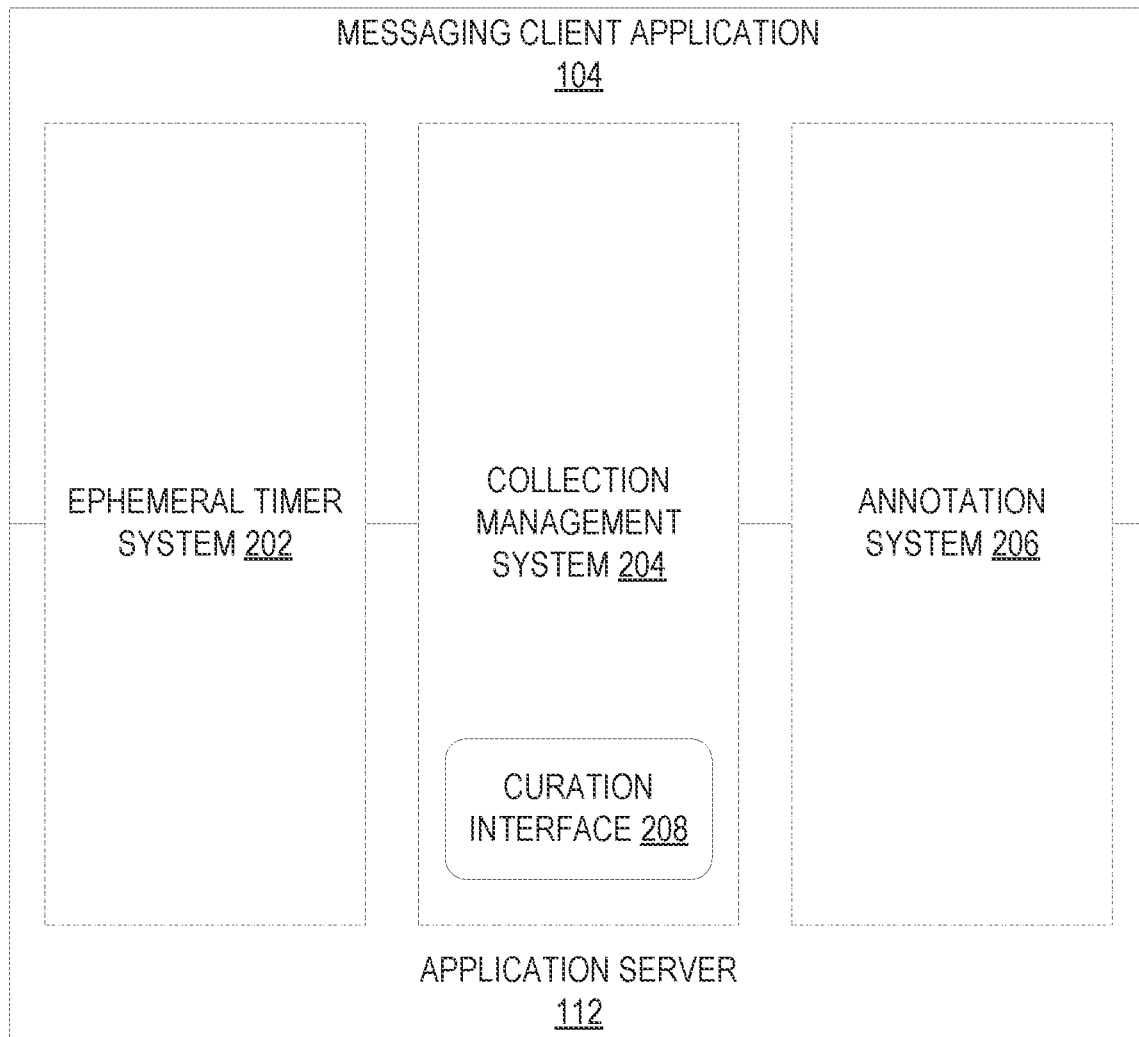
FIG. 2 is block diagram illustrating further details regarding a messaging system, according to example embodiments.

FIG. 2 is block diagram illustrating further details regarding the messaging system 100, according to example embodiments. Specifically, the messaging system 100 is shown to comprise the messaging client application 104 and the application server 112, which in turn embody a number of some subsystems, namely an ephemeral timer system 202, a collection management system 204 and an annotation system 206.

The ephemeral timer system 202 is responsible for enforcing the temporary access to content permitted by the messaging client application 104 and the messaging server application 114. To this end, the ephemeral timer system 202 incorporates a number of timers that, based on duration and display parameters associated with a message, collection of messages (e.g., a SNAPCHAT story), or graphical element, selectively display and enable access to messages and associated content via the messaging client application 104. Further details regarding the operation of the ephemeral timer system 202 are provided below.

The collection management system 204 is responsible for managing collections of media (e.g., collections of text, image video and audio data). In some examples, a collection of content (e.g., messages, including images, video, text and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client application 104.

The collection management system 204 furthermore includes a curation interface 208 that allows a collection manager to manage and curate a particular collection of content. For example, the curation interface 208 enables an event organizer to curate a collection of content relating to a specific event (e.g., delete inappropriate content or redundant messages). Additionally, the collection management system 204 employs machine vision (or image recognition technology) and content rules to automatically curate a content collection. In certain embodiments, compensation may be paid to a user for inclusion of user generated content into a collection, in such cases, the curation interface 208 operates to automatically make payments to such users for the use of their content.

The annotation system 206 provides various functions that enable a user to annotate or otherwise modify or edit media content associated with a message. For example, the annotation system 206 provides functions related to the generation and publishing of media overlays for messages processed by the messaging system 100. The annotation system 206 operatively supplies a media overlay (e.g., a SNAPCHAT filter) to the messaging client application 104 based on a geolocation of the client device 102. In another example, the annotation system 206 operatively supplies a media overlay to the messaging client application 104 based on other information, such as, social network information of the user of the client device 102. A media overlay may include audio and visual content and visual effects. Examples of audio and visual content include pictures, texts, logos, animations, and sound effects, as well as animated facial models, such as those generated by the contextual filter system 124. An example of a visual effect includes color overlaying. The audio and visual content or the visual effects can be applied to a media content item (e.g., a photo) at the client device 102. For example, the media overlay including text that can be overlaid on top of a photograph generated taken by the client device 102. In another example, the media overlay includes an identification of a location overlay (e.g., Venice beach), a name of a live event, or a name of a merchant overlay (e.g., Beach Coffee House). In another example, the annotation system 206 uses the geolocation of the client device 102 to identify a media overlay that includes the name of a merchant at the geolocation of the client device 102. The media overlay may include other indicia associated with the merchant. The media overlays may be stored in the database 120 and accessed through the database server 118.

In one example embodiment, the annotation system 206 provides a user-based publication platform that enables users to select a geolocation on a map, and upload content associated with the selected geolocation. The user may also specify circumstances under which a particular media overlay should be offered to other users. The annotation system 206 generates a media overlay that includes the uploaded content and associates the uploaded content with the selected geolocation.

Figure 3:
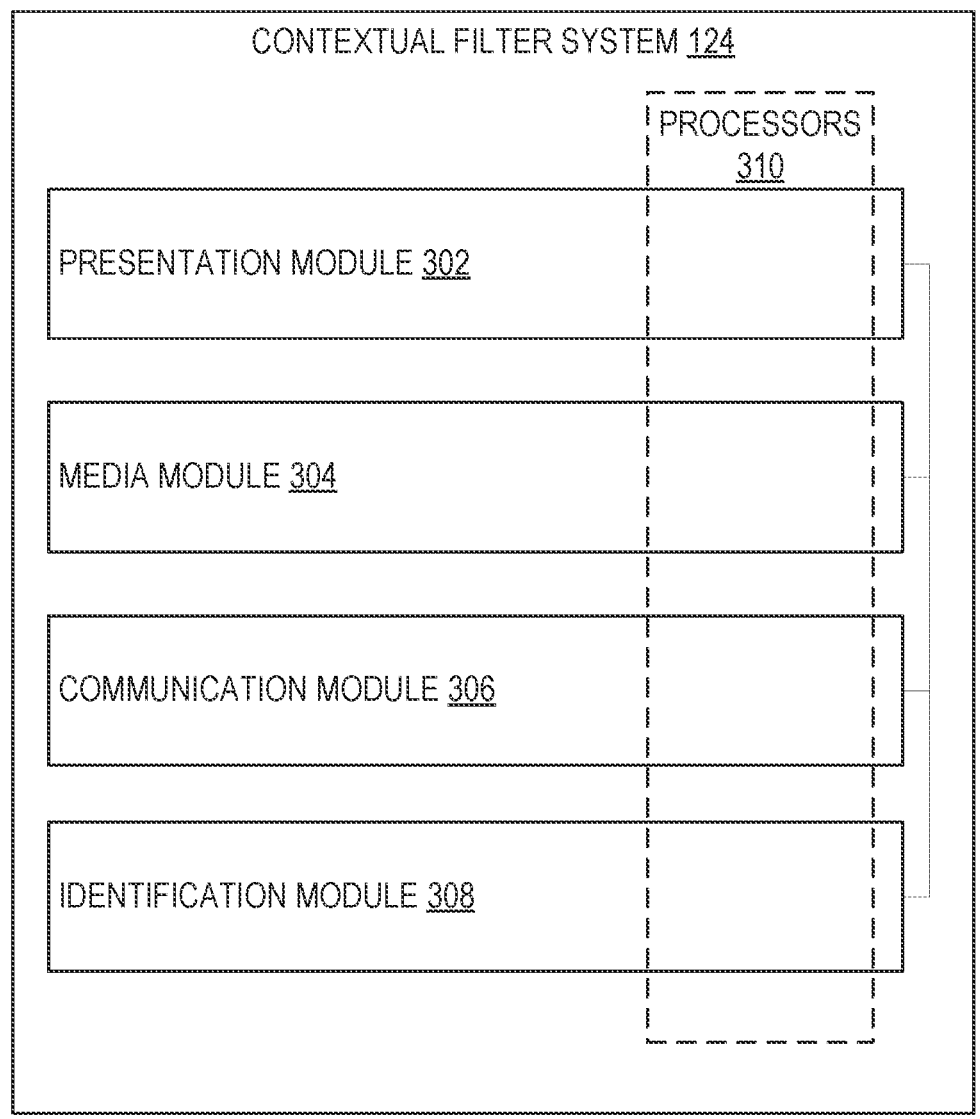
FIG. 3 is a block diagram illustrating various modules of a contextual filter system, according to certain example embodiments.

In another example embodiment, the annotation system 206 provides a merchant-based publication platform that enables merchants to select a particular media overlay associated with a geolocation via a bidding process. For example, the annotation system 206 associates the media overlay of a highest bidding merchant with a corresponding geolocation for a predefined amount of time FIG. 3 is a block diagram illustrating components of the contextual filter system 124 that configure the contextual filter system 124 to perform operations to capture an image frame that includes a depiction of an object from a client device 102, identify one or more objects or object categories within the image frame based on the depiction of the object, select one or more labels or tags based on the object or object categories, retrieve a set of media content based on the labels or tags, and cause display of a presentation of the set of media content within the image frame at the client device, according to some example embodiments.

The contextual filter system 124 is shown as including a presentation module 302, a media module 304, a communication module 306, and an identification module 308, all configured to communicate with each other (e.g., via a bus, shared memory, or a switch). Any one or more of these modules may be implemented using one or more processors 310 (e.g., by configuring such one or more processors to perform functions described for that module) and hence may include one or more of the processors 310.

Any one or more of the modules described may be implemented using hardware alone (e.g., one or more of the processors 310 of a machine) or a combination of hardware and software. For example, any module described of the contextual filter system 124 may physically include an arrangement of one or more of the processors 310 (e.g., a subset of or among the one or more processors of the machine) configured to perform the operations described herein for that module. As another example, any module of the contextual filter system 124 may include software, hardware, or both, that configure an arrangement of one or more processors 310 (e.g., among the one or more processors of the machine) to perform the operations described herein for that module. Accordingly, different modules of the contextual filter system 124 may include and configure different arrangements of such processors 310 or a single arrangement of such processors 310 at different points in time. Moreover, any two or more modules of the contextual filter system 124 may be combined into a single module, and the functions described herein for a single module may be subdivided among multiple modules. Furthermore, according to various example embodiments, modules described herein as being implemented within a single machine, database, or device may be distributed across multiple machines, databases, or devices.

FIG. 4 is a flowchart depicting a method 400 of causing display of a contextual filter at a client device 102, according to certain example embodiments. Operations of the method 400 may be performed by the modules described above with respect to FIG. 3. As shown in FIG. 4, the method 400 includes one or more operations 402, 404, 406, 408, and 410.

At operation 402, the presentation module 302 captures an image frame at the client device 102, wherein the image frame includes a depiction of an object at a position within the image frame. For example, the presentation module 302 may activate a camera of the client device 102, and cause the camera of the client device 102 to capture the image frame.

At operation 404, the identification module 308 identifies an object depicted within the image frame. In some embodiments, to identify the object, the identification module 308 may utilize computer vision to perform one or more image or pattern recognition techniques. In further embodiments, the identification module 308 may identify one or more QR codes within the image frame, and identify the object based on the QR codes.

At operation 406, the media module 304 accesses media content associated with the identified object within a media repository (e.g., the databases 120). For example, in some embodiments, the identification module 308 may select one or more tags or labels based on the identification of the object within the image frame, and cause the media module 304 to query the media repository based on the selected tags or labels. The media module 304 may therefore access a set of media content relevant to the object identified within the image frame, by referencing media content labeled within the media repository with the selected tags or labels.

At operation 408, the presentation module 302 generates a presentation of the set of media content to be displayed within the image frame at the client device 102. For example, the presentation of the set of media content may include an AR display of the set of media content, such that the retrieved media content appears to interact with elements depicted within the image frame, in real time.

In some embodiments, to generate the presentation of the media content, the presentation module 302 retrieves a media template, wherein the media template defines a presentation format and layout to be applied to the set of media content. For example, the media template may define positions and orientations to present the media content within the image frame, at the client device 102.

In some embodiments, to generate the presentation of the media content to be displayed at the client device 102, the media module 304 provides the client device 102 with identifiers of each media content among the set of media content, such that the client device 102 may identify the relevant media content within a local memory repository.

At operation 410, the presentation module 302 causes display of the presentation of the set of media content within the image frame at the client device 102. In some embodiments, the presentation of the set of media content within the image frame may be based on the position of the object identified within the image frame. For example, the presentation module 302 may orient the presentation of the set of media content within the image frame based on the position of the identified object.

In some embodiments, the user of the client device 102 may provide one or more inputs to generate a message based on the image frame that includes the presentation of the set of media contents, and cause the communication module 308 to distribute the message to one or more recipients defined by the user of the client device 102.

FIG. 5 is a flowchart depicting a method 500 of causing display of a contextual filter at a client device 102, according to certain example embodiments. Operations of the method 500 may be performed by the modules described above with respect to FIG. 3. As shown in FIG. 5, the method 500 includes one or more operations 502, 504, and 506.

At operation 502, responsive to accessing the media content at the media repository, the media module 304 retrieves a media template to generate the presentation of the set of media content to be displayed within the image frame. In some embodiments, the media module 304 may access a template repository (e.g., the database 120) to retrieve a media template that corresponds with an object category associated with the object identified within the image frame.

At operation 504, the media module 304 populates the media template with the set of media content accessed from the media repository to generate the presentation of the set of media content.

At operation 506, the presentation module 302 causes display of the presentation of the populated template within the image frame at the client device 102. In some embodiments, the presentation module 302 may display the populated template at a position within the image frame based on the location of the object identified within the image frame.

FIG. 6 is a flowchart depicting a method 500 of generating a contextual filter to be displayed at a client device 102, according to certain example embodiments. Operations of the method 600 may be performed by the modules described above with respect to FIG. 3. As shown in FIG. 6, the method 600 includes one or more operations 602, 604, and 606.

At operation 602, as in operation 402, the presentation module 302 captures an image frame at the client device 102, wherein the image frame includes a depiction of an object at a position within the image frame. For example, the presentation module 302 may activate a camera of the client device 102, and cause the camera of the client device 102 to capture the image frame. In some embodiments, the image frame captured by the presentation module 302 may include image metadata that includes location data, temporal data, as well as device data of the client device 102.

At operation 604, the identification module 308 determines a context of the client device 102 in response to the capturing the image frame. For example, the context may include a location of the client device, a time of day in which the image frame was captured, as well as a device type of the client device 102.

In some embodiments, the identification module 308 may parse the metadata of the image frame in order to determine the relevant context information from the location data, temporal data, and device data of the metadata.

At operation 608, the media module 304 accesses the media repository to identify the relevant media content based on the identification of the object, and the context of the client device 102. For example, the media content may be tagged with location information or temporal information within the media repository, such that reference to a particular time of day, season, day of week, month, or place, may identify a set of relevant media content.

FIG. 7 is an interface flow-diagram 700 depicting interfaces presented by a contextual filter system 124, according to certain example embodiments. Operations depicted by the interfaces of the flow-diagram 700 may be performed by the modules described above with respect to FIG. 3.

Interface 705 depicts an image frame captured by a client device 102. As seen in FIG. 7, the interface 705 includes a depiction of an object 720 at a position within the interface 705.

In some embodiments, the client device 102 may activate the contextual filter system 124 and cause the contextual filter system 124 to capture the image frame depicted within the interface 705 in response to receiving a user input selecting the user option 725, as displayed within the interface 705.

Responsive to receiving the input selecting the user option 725, the contextual filter system 124 may cause display of a graphical icon 730 within the interface 710, to indicate that the contextual filter system 124 has been activated.

Interface 715 comprises a presentation of a set of media content 735 displayed within the image frame captured by the client device 102. As seen in the interface 715, the presentation of the set of media content 735 may be displayed at a position within the image frame based on a position of the object 720. As seen in the interface 715, the presentation of the set of media content 735 may comprise a plurality of media items that include images and GIFs relevant to the object 720.

For example, as seen in FIG. 7, the object 720 is a bag of chips. The contextual filter system 124 identifies an object category of the object 720 (e.g., food, snacks, etc.), and retrieves the set of media content 735, wherein the set of media content 735 includes media content tagged or labeled with the object category of the object 720.

The positions of each media content among the set of media content 735 within the image frame depicted in the interface 705 may be determined based on a media template, as discussed in the methods 400, 500, and 600. A user of a client device 102 may thereby generate a message that includes the set of media content 735 to be distributed to one or more recipients identified by the user of the client device 102. In some embodiments, the message may include an ephemeral message.

Software Architecture

Figure 8:
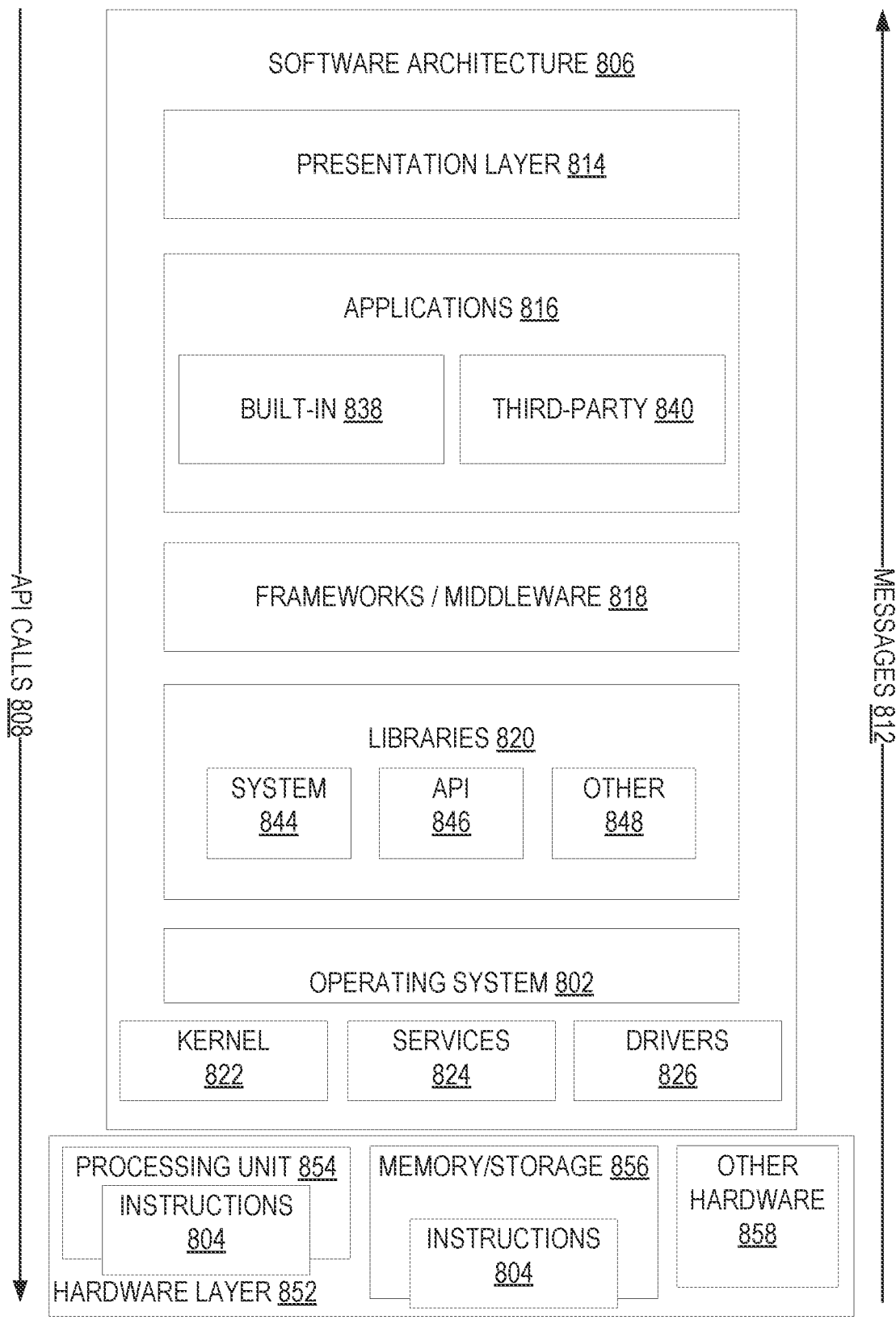
FIG. 8 is a block diagram illustrating a representative software architecture, which may be used in conjunction with various hardware architectures herein described and used to implement various embodiments.

FIG. 8 is a block diagram illustrating an example software architecture 806, which may be used in conjunction with various hardware architectures herein described. FIG. 8 is a non-limiting example of a software architecture and it will be appreciated that many other architectures may be implemented to facilitate the functionality described herein. The software architecture 806 may execute on hardware such as machine 900 of FIG. 9 that includes, among other things, processors 904, memory 914, and I/O components 918. A representative hardware layer 852 is illustrated and can represent, for example, the machine 800 of FIG. 8. The representative hardware layer 852 includes a processing unit 854 having associated executable instructions 804. Executable instructions 804 represent the executable instructions of the software architecture 806, including implementation of the methods, components and so forth described herein. The hardware layer 852 also includes memory and/or storage modules memory/storage 856, which also have executable instructions 804. The hardware layer 852 may also comprise other hardware 858.

In the example architecture of FIG. 8, the software architecture 806 may be conceptualized as a stack of layers where each layer provides particular functionality. For example, the software architecture 806 may include layers such as an operating system 802, libraries 820, applications 816 and a presentation layer 814. Operationally, the applications 816 and/or other components within the layers may invoke application programming interface (API) API calls 808 through the software stack and receive a response as in response to the API calls 808. The layers illustrated are representative in nature and not all software architectures have all layers. For example, some mobile or special purpose operating systems may not provide a frameworks/ middleware 818, while others may provide such a layer. Other software architectures may include additional or different layers.

The operating system 802 may manage hardware resources and provide common services. The operating system 802 may include, for example, a kernel 822, services 824 and drivers 826. The kernel 822 may act as an abstraction layer between the hardware and the other software layers. For example, the kernel 822 may be responsible for memory management, processor management (e.g., scheduling), component management, networking, security settings, and so on. The services 824 may provide other common services for the other software layers. The drivers 826 are responsible for controlling or interfacing with the underlying hardware. For instance, the drivers 826 include display drivers, camera drivers, Bluetooth® drivers, flash memory drivers, serial communication drivers (e.g., Universal Serial Bus (USB) drivers), Wi-Fi® drivers, audio drivers, power management drivers, and so forth depending on the hardware configuration.

The libraries 820 provide a common infrastructure that is used by the applications 816 and/or other components and/or layers. The libraries 820 provide functionality that allows other software components to perform tasks in an easier fashion than to interface directly with the underlying operating system 802 functionality (e.g., kernel 822, services 824 and/or drivers 826). The libraries 820 may include system libraries 844 (e.g., C standard library) that may provide functions such as memory allocation functions, string manipulation functions, mathematical functions, and the like. In addition, the libraries 820 may include API libraries 846 such as media libraries (e.g., libraries to support presentation and manipulation of various media format such as MPREG4, H.264, MP3, AAC, AMR JPG, PNG), graphics libraries (e.g., an OpenGL framework that may be used to render 2D and 3D in a graphic content on a display), database libraries (e.g., SQLite that may provide various relational database functions), web libraries (e.g., WebKit that may provide web browsing functionality), and the like. The libraries 820 may also include a wide variety of other libraries 848 to provide many other APIs to the applications 816 and other software components/modules.

The frameworks/middleware 818 (also sometimes referred to as middleware) provide a higher-level common infrastructure that may be used by the applications 816 and/or other software components/modules. For example, the frameworks/middleware 818 may provide various graphic user interface (GUI) functions, high-level resource management, high-level location services, and so forth. The frameworks/middleware 818 may provide a broad spectrum of other APIs that may be utilized by the applications 816 and/or other software components/modules, some of which may be specific to a particular operating system 802 or platform.

The applications 816 include built-in applications 838 and/or third-party applications 840. Examples of representative built-in applications 838 may include, but are not limited to, a contacts application, a browser application, a book reader application, a location application, a media application, a messaging application, and/or a game application. Third-party, applications 840 may include an application developed using the ANDROID™ or IOS™ software development kit (SDK) by an entity other than the vendor of the particular platform, and may be mobile software running on a mobile operating system such as IOS™, ANDROID™, WINDOWS® Phone, or other mobile operating systems. The third-party applications 840 may invoke the API calls 808 provided by the mobile operating system (such as operating system 802) to facilitate functionality described herein.

The applications 816 may use built in operating system functions (e.g., kernel 822, services 824 and/or drivers 826), libraries 820, and frameworks/middleware 818 to create user interfaces to interact with users of the system. Alternatively, or additionally, in some systems interactions with a user may occur through a presentation layer, such as presentation layer 814. In these systems, the application/component "logic" can be separated from the aspects of the application/component that interact with a user.

Figure 9:
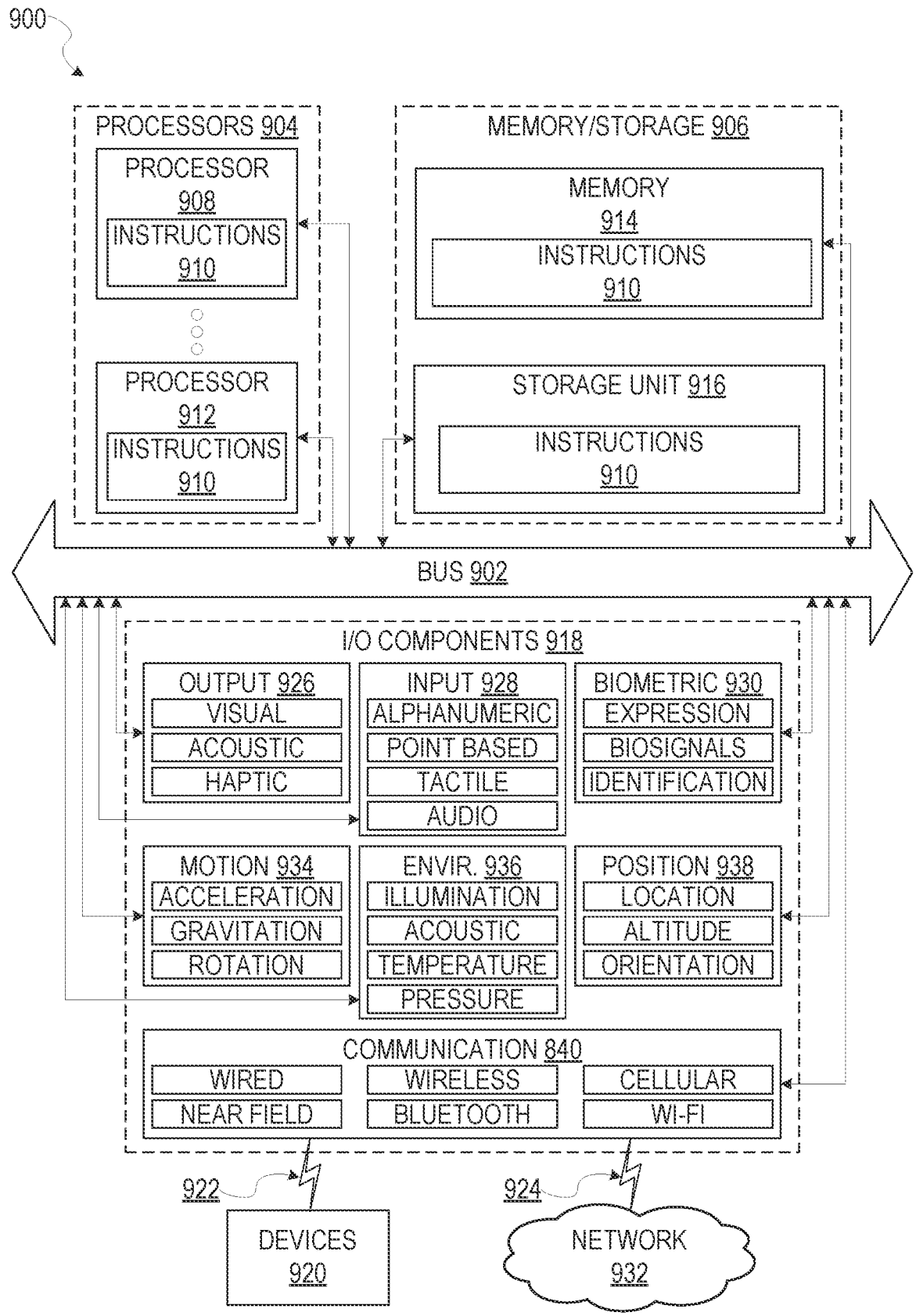
FIG. 9 is a block diagram illustrating components of a machine, according to some example embodiments, able to read instructions from a machine-readable medium (e.g., a machine-readable storage medium) and perform any one or more of the methodologies discussed herein.

FIG. 9 is a block diagram illustrating components of a machine 900, according to some example embodiments, able to read instructions from a machine-readable medium (e.g., a machine-readable storage medium) and perform any one or more of the methodologies discussed herein. Specifically, FIG. 9 shows a diagrammatic representation of the machine 900 in the example form of a computer system, within which instructions 910 (e.g., software, a program, an application, an applet, an app, or other executable code) for causing the machine 900 to perform any one or more of the methodologies discussed herein may be executed. As such, the instructions 910 may be used to implement modules or components described herein. The instructions 910 transform the general, non-programmed machine 900 into a particular machine 900 programmed to carry out the described and illustrated functions in the manner described. In alternative embodiments, the machine 900 operates as a standalone device or may be coupled (e.g., networked) to other machines. In a networked deployment, the machine 900 may operate in the capacity of a server machine or a client machine in a server-client network environment, or as a peer machine in a peer-to-peer (or distributed) network environment. The machine 900 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 910, sequentially or otherwise, that specify actions to be taken by machine 900. Further, while only a single machine 900 is illustrated, the term "machine" shall also be taken to include a collection of machines that individually or jointly execute the instructions 910 to perform any one or more of the methodologies discussed herein.

The machine 900 may include processors 904, memory memory/storage 906, and I/O components 918, which may be configured to communicate with each other such as via a bus 902. The memory/storage 906 may include a memory 914, such as a main memory, or other memory storage, and a storage unit 916, both accessible to the processors 904 such as via the bus 902. The storage unit 916 and memory 914 store the instructions 910 embodying any one or more of the methodologies or functions described herein. The instructions 910 may also reside, completely or partially, within the memory 914, within the storage unit 916, within at least one of the processors 904 (e.g., within the processor's cache memory), or any suitable combination thereof, during execution thereof by the machine 900. Accordingly, the memory 914, the storage unit 916, and the memory of processors 904 are examples of machine-readable media.

The I/O components 918 may include a wide variety of components to receive input, provide output, produce output, transmit information, exchange information, capture measurements, and so on. The specific I/O components 918 that are included in a particular machine 900 will depend on the type of machine. For example, portable machines such as mobile phones will likely include a touch input device or other such input mechanisms, while a headless server machine will likely not include such a touch input device. It will be appreciated that the I/O components 918 may include many other components that are not shown in FIG. 9. The I/O components 918 are grouped according to functionality merely for simplifying the following discussion and the grouping is in no way limiting. In various example embodiments, the I/O components 918 may include output components 926 and input components 928. The output components 926 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 928 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instrument), tactile input components (e.g., a physical button, a touch screen that provides location and/or force of touches or touch gestures, or other tactile input components), audio input components (e.g., a microphone), and the like.

In further example embodiments, the I/O components 918 may include biometric components 930, motion components 934, environmental environment components 936, or position components 938 among a wide array of other components. For example, the biometric components 930 may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. The motion components 934 may include acceleration sensor components (e.g., accelerometer), gravitation sensor components, rotation sensor components (e.g., gyroscope), and so forth. The environment components 936 may include, for example, illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. The position components 938 may include location sensor components (e.g., a Global Position system (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 918 may include communication components 940 operable to couple the machine 900 to a network 932 or devices 920 via coupling 922 and coupling 924 respectively. For example, the communication components 940 may include a network interface component or other suitable device to interface with the network 932. In further examples, communication components 940 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 920 may be another machine or any of a wide variety of peripheral devices (e.g., a peripheral device coupled via a Universal Serial Bus (USB)).

Moreover, the communication components 940 may detect identifiers or include components operable to detect identifiers. For example, the communication components 940 may include Radio Frequency Identification (MD) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 940, such as, location via Internet Protocol (IP) geo-location, location via Wi-Fi® signal triangulation, location via detecting a NFC beacon signal that may indicate a particular location, and so forth.

Glossary

"CAR ER SIGNAL" in this context refers to any intangible medium that is capable of storing, encoding, or carrying instructions for execution by the machine, and includes digital or analog communications signals or other intangible medium to facilitate communication of such instructions. Instructions may be transmitted or received over the network using a transmission medium via a network interface device and using any one of a number of well-known transfer protocols.

"CLIENT DEVICE" in this context refers to any machine that interfaces to a communications network to obtain resources from one or more server systems or other client devices. A client device may be, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, or any other communication device that a user may use to access a network.

"COMMUNICATIONS NETWORK" in this context refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other type of cellular or wireless coupling in this example, the coupling may implement any of a variety of types of data transfer technology, such as Single Carrier Radio Transmission Technology (1×RTT), Evolution-Data Optimized (ENDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

"EMPHEMERAL MESSAGE" in this context refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"MACHINE-READABLE MEDIUM" in this context refers to a component, device or other tangible media able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) and/or any suitable combination thereof. The term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing instructions (e.g., code) for execution by a machine, such that the instructions, when executed by one or more processors of the machine, cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

"COMPONENT" in this context refers to a device, physical entity or logic having boundaries defined by function or subroutine calls, branch points, application program interfaces (APIs), or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components, A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently, configured to perform certain operations. A hardware component may be a special-purpose processor, such as a Field-Programmable Gate Array (FPGA) or an Application Specific Integrated Circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any, one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"PROCESSOR" in this context refers to any circuit or virtual circuit (a physical circuit emulated by logic executing on an actual processor) that manipulates data values according to control signals (e.g., "commands", "op codes", "machine code", etc.) and which produces corresponding output signals that are applied to operate a machine. A processor may, for example, be a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC) or any combination thereof. A processor may further be a multi-core processor having two or more independent processors (sometimes referred to as "cores") that may execute instructions contemporaneously.

"TIMESTAMP" in this context refers to a sequence of characters or encoded information identifying when a certain event occurred, for example giving date and time of day, sometimes accurate to a small fraction of a second.

"LIFT" in this context is a measure of the performance of a targeted model at predicting or classifying cases as having an enhanced response (with respect to a population as a whole), measured against a random choice targeting model.

"PHONEME ALIGNMENT" in this context, a phoneme is a unit of speech that differentiates one word from another. One phoneme may consist of a sequence of closure, burst, and aspiration events; or, a dipthong may transition from a back vowel to a front vowel. A speech signal may therefore be described not only by what phonemes it contains, but also the locations of the phonemes. Phoneme alignment may therefore be described as a "time-alignment" of phonemes in a waveform, in order to determine an appropriate sequence and location of each phoneme in a speech signal.

"AUDIO-TO-VISUAL CONVERSION" in this context refers to the conversion of audible speech signals into visible speech, wherein the visible speech may include a mouth shape representative of the audible speech signal.

"TIME DELAYED NEURAL NETWORK (TDNN)" in this context, a TDNN is an artificial neural network architecture whose primary purpose is to work on sequential data. An example would be converting continuous audio into a stream of classified phoneme labels for speech recognition.

"BI-DIRECTIONAL LONG-SHORT TERM MEMORY (BLSTM)" in this context refers to a recurrent neural network (RNN) architecture that remembers values over arbitrary intervals. Stored values are not modified as learning proceeds. RNNs allow forward and backward connections between neurons. BLSTM are well-suited for the classification, processing, and prediction of time series, given time lags of unknown size and duration between events.

What is claimed is:

1. A method comprising:
   causing display of a graphical user interface at a client device, the graphical user interface including a display of a graphical icon;
   receiving an input that selects the graphical icon from the client device;
   determining a context of the client device in response to the input that selects the graphical icon;
   accessing media content from among a collection of media content based on the context; and
   causing display of a presentation of the media content within the graphical user interface.

2. The method of claim 1, wherein the context includes one or more of:
   a location of the client device;
   a time of day; and
   a device type associated with the client device.

3. The method of claim 1, wherein the method further comprises:
   generating a message that includes the media content.

4. The method of claim 1, wherein the media content includes a media overlay.

5. The method of claim 1, wherein the causing display of the graphical user interface that includes the display of the graphical icon includes:
   causing display of image data within the graphical user interface, the image data comprising image metadata; and
   wherein the determining the context of the client device is based on the image metadata of the image data.

6. The method of claim 1, wherein the media content comprises a tag that corresponds with the context, and wherein the accessing the media content from among the collection of media content based on the context includes:
   selecting the media content based on the tag.

7. The method of claim 1, wherein the causing display of the graphical user interface at the client device includes causing display of a presentation of image data that comprises a depiction of an object, and wherein the determining the context of the client device includes:
   identifying the object depicted by the presentation of the image data; and
   determining the context based on the object.

8. A system comprising:
   a memory; and
   at least one hardware processor coupled to the memory and comprising instructions that causes the system to perform operations comprising:
   causing display of a graphical user interface at a client device, the graphical user interface including a display of a graphical icon;
   receiving an input that selects the graphical icon from the client device;
   determining a context of the client device in response to the input that selects the graphical icon;
   accessing media content from among a collection of media content based on the context; and
   causing display of a presentation of the media content within the graphical user interface.

9. The system of claim 8, wherein the context includes one or more of:
   a location of the client device;
   a time of day; and
   a device type associated with the client device.

10. The system of claim 8, wherein the operations further comprise:
    generating a message that includes the media content.

11. The system of claim 8, wherein the media content includes a media overlay.

12. The system of claim 8, wherein the causing display of the graphical user interface that includes the display of the graphical icon includes:
    causing display of image data within the graphical user interface, the image data comprising image metadata; and
    wherein the determining the context of the client device is based on the image metadata of the image data.

13. The system of claim 8, wherein the media content comprises a tag that corresponds with the context, and wherein the accessing the media content from among the collection of media content based on the context includes:
    selecting the media content based on the tag.

14. The system of claim 8, wherein the causing display of the graphical user interface at the client device includes causing display of a presentation of image data that comprises a depiction of an object, and wherein the determining the context of the client device includes:
    identifying the object depicted by the presentation of the image data; and
    determining the context based on the object.

15. A non-transitory machine-readable storage medium comprising instructions that, when executed by one or more processors of a machine, cause the machine to perform operations comprising:
    causing display of a graphical user interface at a client device, the graphical user interface including a display of a graphical icon;
    receiving an input that selects the graphical icon from the client device;
    determining a context of the client device in response to the input that selects the graphical icon;
    accessing media content from among a collection of media content based on the context; and
    causing display of a presentation of the media content within the graphical user interface.

16. The non-transitory machine-readable storage medium of claim 15, wherein the context includes one or more of:
    a location of the client device;
    a time of day; and
    a device type associated with the client device.

17. The non-transitory machine-readable storage medium of claim 15, wherein the operations further comprise:
    generating a message that includes the media content.

18. The non-transitory machine-readable storage medium of claim 15, wherein the media content includes a media overlay.

19. The non-transitory machine-readable storage medium of claim 15, wherein the causing display of the graphical user interface that includes the display of the graphical icon includes:
- causing display of image data within the graphical user interface, the image data comprising image metadata; and
- wherein the determining the context of the client device is based on the image metadata of the image data.

20. The non-transitory machine-readable storage medium of claim 15, wherein the media content comprises a tag that corresponds with the context, and wherein the accessing the media content from among the collection of media content based on the context includes:
- selecting the media content based on the tag.

\* \* \* \* \*